United States Patent
Nils

(10) Patent No.: US 8,967,373 B2
(45) Date of Patent: Mar. 3, 2015

(54) CONVEYOR

(75) Inventor: Erikkson Hakan Nils, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 318 days.

(21) Appl. No.: 13/582,074

(22) PCT Filed: Mar. 2, 2011

(86) PCT No.: PCT/SE2011/050236
§ 371 (c)(1),
(2), (4) Date: Jun. 20, 2013

(87) PCT Pub. No.: WO2011/108984
PCT Pub. Date: Sep. 9, 2011

(65) Prior Publication Data
US 2014/0144758 A1 May 29, 2014

(30) Foreign Application Priority Data
Mar. 3, 2010 (SE) ...................................... 1050203

(51) Int. Cl.
*B65G 23/44* (2006.01)
*B65G 15/62* (2006.01)
*B65G 15/60* (2006.01)

(52) U.S. Cl.
CPC ................ *B65G 15/60* (2013.01); *B65G 15/62* (2013.01); *B65G 23/44* (2013.01)
USPC ....................................................... 198/816

(58) Field of Classification Search
CPC ........ B65G 23/44; B65G 15/60; B65G 15/62; B65G 2812/02188
USPC .................................................. 198/813–816
See application file for complete search history.

(56) References Cited

U.S. PATENT DOCUMENTS

| | | | | |
|---|---|---|---|---|
| 5,022,514 A | * | 6/1991 | Lofberg | 198/813 |
| 5,489,056 A | * | 2/1996 | Staschewski | 226/173 |
| 6,298,981 B1 | * | 10/2001 | Hosch et al. | 198/813 |
| 6,336,550 B1 | * | 1/2002 | Muntener | 198/806 |
| 6,685,009 B1 | * | 2/2004 | Hosch et al. | 198/813 |

(Continued)

FOREIGN PATENT DOCUMENTS

| DE | 3531552 A1 | 3/1987 |
|---|---|---|
| DE | 3743729 A1 | 7/1989 |

(Continued)

OTHER PUBLICATIONS

Spivakovky A.O. et al. Transport Machine—M:Machinebuilding, publ. 1983.

*Primary Examiner* — Mark A Deuble
(74) *Attorney, Agent, or Firm* — Corinne Gorski

(57) ABSTRACT

A conveyor, comprising; two opposite rolls (1, 2), a frame that comprises two opposite beams (3, 4) that carry the rolls (1, 2) and extend in their longitudinal direction between the rolls (1, 2), an endless metal belt (5) extending in a path around and carried by the two rolls (1, 2), and a support element (11) that extends between and is connected to each of the two beams (3, 4), wherein at least one of the rolls (1, 2) is displaceable in the longitudinal direction of the beams (3, 4) in order to enable tightening or loosing of the belt (5), and wherein there is provided a jack (10) that is connected to and acts on said roll (1) for said displacement thereof. The jack (10) is displaceable between at least two operative positions in the longitudinal direction of the beams (3, 4).

15 Claims, 6 Drawing Sheets

(56) References Cited

U.S. PATENT DOCUMENTS

| | | | |
|---|---|---|---|
| 7,267,223 B2 * | 9/2007 | Spoors | 198/860.1 |
| 7,448,491 B1 | 11/2008 | Tippery | |
| 7,650,729 B2 * | 1/2010 | Whittlesey | 53/138.2 |
| 8,469,182 B2 * | 6/2013 | Alotto | 198/813 |
| 2001/0023815 A1 * | 9/2001 | Mott | 198/617 |
| 2002/0008000 A1 | 1/2002 | Lutz | |
| 2004/0118663 A1 | 6/2004 | Gaeddert et al. | |
| 2005/0077152 A1 * | 4/2005 | Pfarr et al. | 198/813 |
| 2005/0189201 A1 | 9/2005 | Schlagel | |

FOREIGN PATENT DOCUMENTS

| | | |
|---|---|---|
| DE | 20210626 U1 | 11/2003 |
| DE | 20210626 U1 | 12/2003 |
| GB | 2042453 A | 9/1980 |
| JP | H06-329228 A | 11/1994 |
| JP | 2001-058713 A | 3/2001 |
| JP | 2001058713 A | 3/2001 |
| SU | 1421638 A | 9/1988 |
| SU | 1421638 A1 | 9/1988 |

* cited by examiner

CONVEYOR

TECHNICAL FIELD

The present invention relates to a conveyor, comprising two opposite rolls, a frame that comprises two opposite beams that carry the rolls and extend in their longitudinal direction between the rolls, an endless metal belt extending in a path around and carried by the two rolls, and a support element that extends between and is connected to each of the two beams, wherein at least one of the rolls is displaceable in the longitudinal direction of the beams in order to enable tightening or loosing of the belt, and wherein there is provided a jack that is connected to and acts on said roll for said displacement thereof.

Such conveyors may be used in a plurality of different conveying applications. Typically, the belt, being a metal belt, is tensioned with a relatively high force, thereby requiring a stable and strong frame to adopt the forces connected to such tensioning. Typically, the tension applied to the belt is above 5 MPa, or even above 7 MPa, depending on roll design and belt material.

Typically at least one of the rolls is displaceable in a direction to and from the other roll in order to thereby enable tensioning and release of the belt, for example during assembly of the conveyor or during any maintenance work on the conveyor.

The term "roll" is to be regarded in a wide sense. As referred to herein, it will include rolls, homogenous as well as tubular ones, shafts and tubular drums with sheaves arranged thereon, and similar designs that, through a rotation thereof, are able of redirecting and defining a travelling path for a belt that bears on an outer periphery of the roll. The rolls are suspended in bearings and thus rotary in relation to the frame.

A jack, as referred to herein, comprises two parts that are moveable in relation to each other in a coaxial and linear manner, which may be induced as a result of the use of a screwing operation in which the parts are connected through a screw joint and one of the parts is screwed in relation to the other part (jack screw), or through the use of a pressure medium by means of which the motion of one of the parts in relation to the other is controlled (piston-cylinder arrangement).

BACKGROUND OF THE INVENTION

Conveyors using endless metal belts are well known. They offer reliable performance as well a high strength and endurance. Metal belts also offer the advantage of being easily cleaned and kept in a disinfected state, which is often an advantage or even a prerequisite, for example in connection to the conveying of food stuff and other products that require clean handling.

Prior art includes conveyors that comprise a metal belt carried by two opposite rolls that, in their turn, are supported by a framework. At least one of the rolls is displaceable in a direction from and towards the other roll in order to enable tensioning and release of the belt. The displaceable roll is carried by a carrier that is arranged so as to roll or slide along guides arranged on the framework. Typically the carrier is a sleigh or box that is supported by bearings which, in their turn, are arranged against guiding surfaces or in slots or grooves provided on opposite beams of the framework.

The beams that accommodate the bearings and along which the carrier is to slide during tensioning or release of the belt need to be stable and provide a well defined path for the bearings. If, for example, the beams are located only a little bit too far away from each other in the region in which the carrier is supported or are not held in position firmly and rigidly enough, there will be an enhanced risk of having a misalignment of the carrier, and the roll, in relation to the longitudinal direction of the conveyor. Such misalignment may be detrimental to the function of the conveyor and should be avoided. If, on the other hand, the distance between the beams in the region of the bearings is too small, there will be excessive resistance against sliding of the carrier. Accordingly, a well defined distance between the beams in the region in which they support the carrier and roll is a desired property of a conveyor.

Prior art solves this problem by suggesting frames that comprises frameworks that include a number of beams and cross bars that have as their task to confer stability to the beams that supports the carrier, thereby precisely determining their position in relation to each other, and to enable adoption of the tensioning forces that result from the tensioning of the belt. However, metal belt conveyors of prior tend to be rather heavy and bulky due to the often relatively complex and largely built framework. A less complicated and lighter frame design would therefore be appreciated. Frameworks of prior art also tend to adopt tensioning forces in a complex way. The tensioning force of the belt that acts in the longitudinal direction of the conveyor and the beams that carry the rolls, are adopted not only by said beams but by the whole framework. It would be desirable to design the frame of the conveyor such that as much as possible of that force would actually be adopted by said beams, thereby further reducing the necessity of further beams and cross bars and will add to the weight, size and complexity of the conveyor.

There is also a desire to enable the use of belts of different lengths in one and the same conveyor frame. In order to enable use of different belt lengths, the conveyor design must permit a corresponding displacement of the rolls to and from each other. It is a technical challenge to find design solutions that permit such displacement, and still promotes a compact and stable conveyor design.

THE OBJECT OF THE INVENTION

The object of the invention is to provide a conveyor the design of which promotes a less bulky and heavy conveyor frame.

Thereby, the object of the invention is to present a conveyor in which the range within which the roll can be displaced by means of the jack is increased, and a wider range of belt lengths can be used in one and the same conveyor.

SUMMARY OF THE INVENTION

The object of the invention is achieved by means of a conveyor, comprising; two opposite rolls, a frame that comprises two opposite beams that carry the rolls and extend in their longitudinal direction between the rolls, an endless metal belt extending in a path around and carried by the two rolls, and a support element that extends between and is connected to each of the two beams, wherein at least one of the rolls is displaceable in the longitudinal direction of the beams in order to enable tightening or loosing of the belt, and wherein there is provided a jack that is connected to and acts on said roll for said displacement thereof, characterised in that the jack is displaceable between at least two operative positions in the longitudinal direction of the beams.

Thereby, the range within which the roll can be displaced by means of the jack is increased, and a wider range of belt lengths can be used in one and the same conveyor. A jack, as referred to herein, comprises two parts that are moveable in relation to each other in a coaxial and linear manner, which may be induced as a result of the use of a screwing operation in which the parts are connected through a screw joint and one of the parts is screwed in relation to the other part (jack screw), or through the use of a pressure medium by means of which the motion of one of the parts in relation to the other is controlled (piston-cylinder arrangement). In the case when a jack screw is used, it is preferred that a spring element is arranged in series with the jack screw in order to adopt tension differences that are due to changes in the temperature of the belt.

According to a preferred embodiment the jack is connected to and supported by the above-mentioned support element. A separate support for the jack is thereby avoided, and space is saved in the conveyor.

It is preferred that the two positions of the jack are on opposite sides of the support element. In a first position, in which the jack is positioned between the displaceable roll and the support element the jack will tension the belt while extending, i.e. by means of pushing carrier in the tensioning direction. In a second position, in which the jack is positioned on the opposite side of the support element, the jack will tension the belt while contracting, i.e. by means of pulling the part of the carrier to which it is attached. In the second position the jack will not form an obstacle for the roll. Accordingly a larger roll, occupying more space, may be used when the jack is in the second position, or the roll may be located closer to the support element, something that makes the whole conveyor more versatile. In order to enable positioning of the jack in the second position and find a support therefore, and in order to further stabilise the carrier against misalignment thereof with regard to the beams, the carrier, and the surfaces thereof that are supported by the beams, may extend beyond the support element in the longitudinal direction of the beams as seen from the displaceable roll.

According to one embodiment the support element is arranged so as to permit an adjustment of the distance between the beams by means thereof. By means of the support element, the distance between the beams in a region in which at least one of the rolls is carried by the latter is controlled and determined. Typically, the roll in question is displaceable in the longitudinal direction of the beam, towards or from the other roll. By means of the support element, the distance between the beams is adjusted with regard to the displacement of the roll. If the roll is displaced away from the support element, and therefore the beams tend to flex away from each other in the region in which the roll is supported by the beams, the support element is adjusted so as to diminish the distance between the beams somewhat in order to achieve a correct distance in said region. The opposite situation arises when the roll is displaced towards the support element.

According to one embodiment of the invention a dimension of the support element is adjustable in a direction crosswise to the longitudinal direction of the beams so as to enable the adjustment of the distance between the beams. The dimension of the support element in said direction crosswise to the longitudinal direction of the beams is adjustable in a stepless manner. This is advantageous since the tolerances may be very small and the adjustment needed may be very fine.

Preferably, the support element is designed according to the principles of a turnbuckle. Thereby, the support element comprises at least three parts, two of which are connected to a respective of said beams and a third of which is connected to each of the other parts through a respective screw joint, and wherein the dimension of the support element in said direction crosswise to the longitudinal direction of the beams is adjustable by means of screwing of said third part in relation to said other parts.

According to one embodiment of the invention at least one of the rolls is displaceable in the longitudinal direction of the beams in order to enable tightening or loosing of the belt, and the support element is located closer to said displaceable roll than to the opposite other roll. Thereby, the effect of the adjustment of the support element is concentrated to the region in which adjustment of the distance between the beams is actually needed.

Further features and advantages of the present invention are presented in the detailed description of preferred embodiments and in the annexed patent claims.

BRIEF DESCRIPTION OF THE DRAWINGS

Embodiments of the invention will now be further elucidated with reference to the annexed drawing, on which

DETAILED DESCRIPTION OF THE INVENTION

Figure 1:
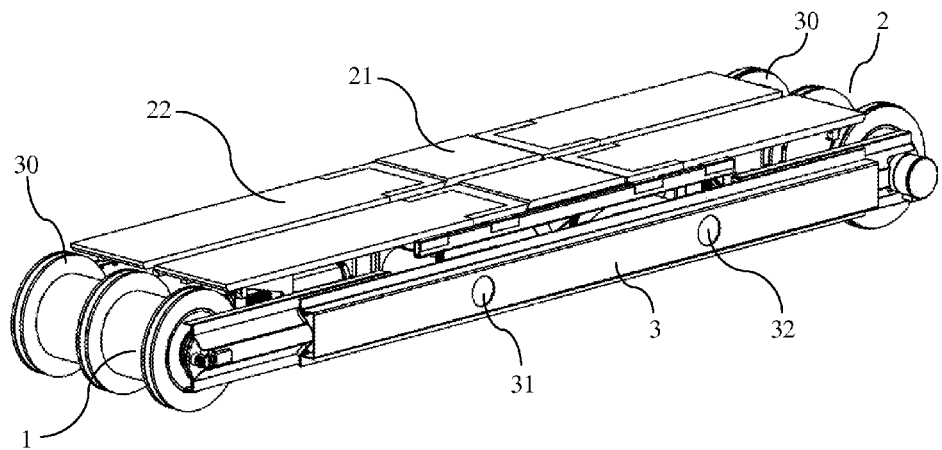
FIG. 1 is a side view of a conveyor according to the invention
Figure 2:
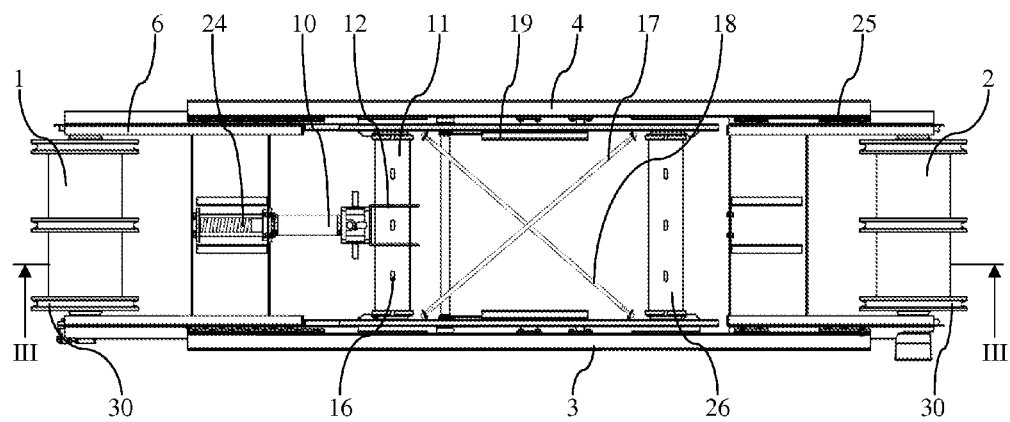
FIG. 2 is a view from above of the conveyor in FIG. 1.
Figure 3:
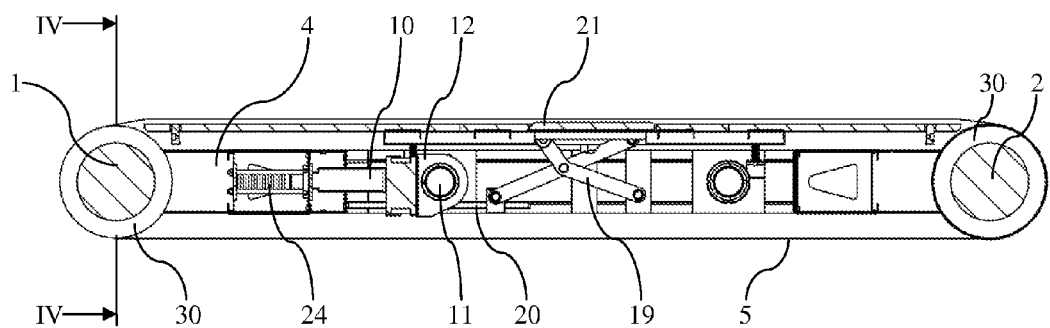
FIG. 3 is a cross-section according to III-III in FIG. 2.

FIGS. 1-3 show a conveyor according to the invention. The conveyor comprises two opposite rotary rolls 1, 2, a frame that comprises two opposite beams 3, 4 that carry the rolls 1, 2 and extend in their longitudinal direction between the rolls 1, 2, and an endless metal belt 5 extending in a path around and carried by the two rolls 1, 2. However, for clarity reasons the belt 5 has been left out in FIGS. 1 and 2. Preferably, the belt 5 is a steel belt, having a thickness of at least 0.3 mm, typically in the range of 0.3-1.6 mm, and a width of at least 200 mm, typically in the range of 200-1500 mm. The belt is of an endless type, thereby having a length that is approximately twice the length of the conveyor itself, wherein the length of the conveyor is defined as the distance between the centre lines of the rolls 1, 2. The length and width of different conveyors may vary within a wide range depending on the specific application in which they are to be used.

The rolls 1, 2 are formed by tubular drums on the outer periphery of which a number of parallel sheaves 30 are attached. The belt 5 is assumed to bear on the outer periphery of said sheaves 30. It should be understood that at least one of the rolls 1, 2 is connected to any apparatus such as an electric motor (not shown) for driving the roll, i.e. rotating it, during operation of the conveyor.

Figure 4:
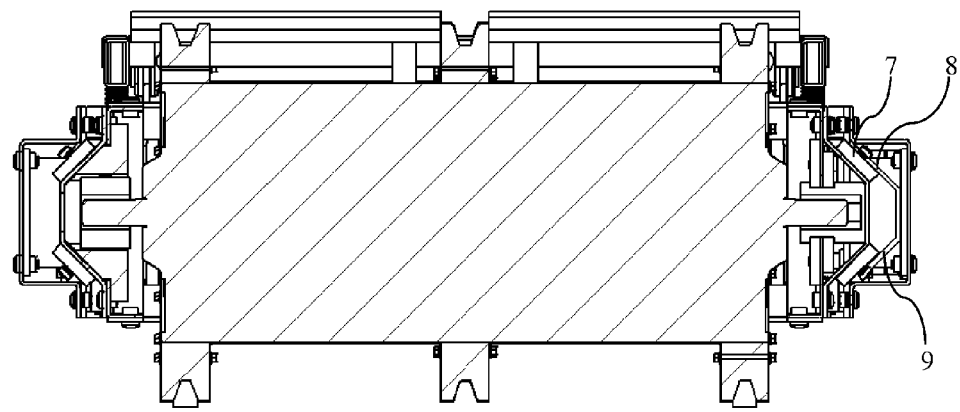
FIG. 4 is a cross-section according to IV-IV in FIG. 3.

The beams 3, 4 are made of metal sheet, preferably steel sheet, which is bent to a profile as shown in FIG. 4. The thickness of the sheet depends on the application, but is typically in the range of 1-5 mm.

The rolls 1, 2 have parallel centre lines, and each beam 3, 4 presents a centre line in its longitudinal direction, wherein the centre lines of the rolls 1, 2 and the beams 3, 4 extend in a common plane. The beams 3, 4 are arranged so as to adopt the compressive force that exists between the rolls 1, 2 as a result of a tensioning of the belt 5.

In order to enable tightening or loosing of the belt 5, a first 1 of the above-mentioned rolls 1, 2 is displaceable in a direction to and from the second roll 2, i.e. in the longitudinal direction of the beams 3, 4. The first roll 1 is carried by a carrier 6 that, in its turn, is supported by the opposite beams 3, 4. The carrier 6 is formed by a sleigh or box-like structure and is able to slide or roll along the beams 3, 4 by means of bearings 7 arranged on surfaces 8, 9 on the beams 3, 4 acting as guide surfaces. The guide surfaces 8, 9 are inclined with regard to the above-mentioned common plane of the centre line of the rolls 1, 2 and the beams 3, 4, such that they support the carrier 6 both in a vertical direction and a horizontal direction crosswise to the longitudinal direction of the beams 3, 4.

With reference to FIGS. 2 and 3, the design of the conveyor is now further described. There is provided a jack 10 that is connected to and acts on the displaceable roll 1 for said displacement thereof. In series with the jack 10 there is provided a spring 24. More precisely, the jack 10 acts on the roll indirectly through the carrier 6 and the spring 24. The jack 10 defines a jack screw that comprises two parts that are movable in relation to each other by means of screwing. As an alternative, the jack could be comprised by a traditional piston-cylinder device driven by a pressure medium. One of said parts is connected to the carrier 6 while the other part is connected to and supported by a support element 11 that will be further described later. The spring element 24 has as its task to adopt tension differences that are caused by contraction or elongation of the belt due to temperature changes. If a piston-cylinder arrangement is used, the spring element 24 can be omitted and the jack be rigidly connected to the carrier 6 (and support element 11).

Figure 6:
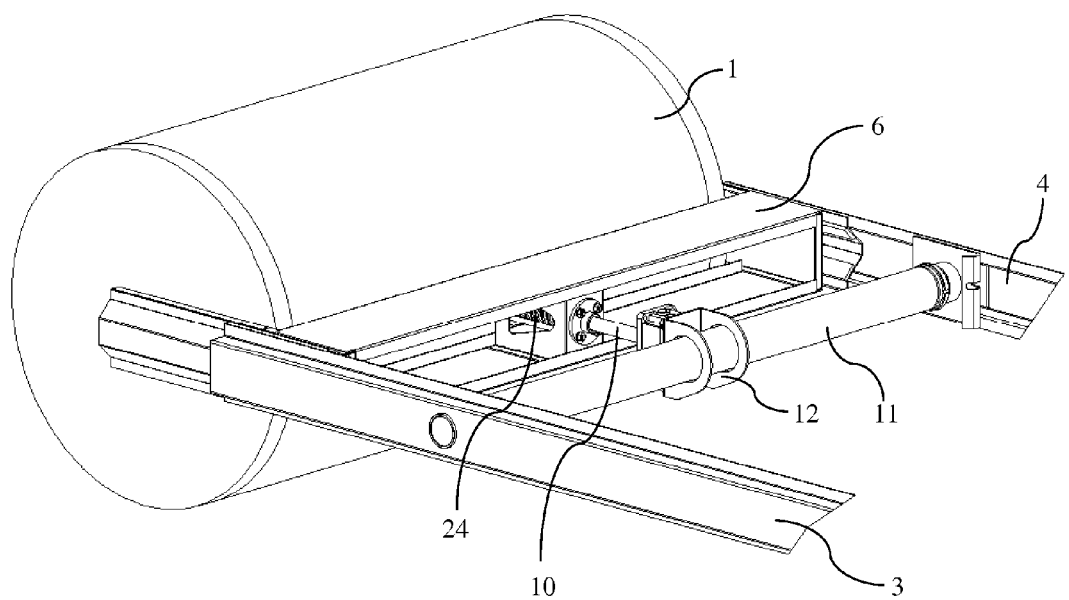
FIG. 6 is a perspective view showing a first embodiment of a part of the conveyor, with a jack thereof in a first position with regard to a support element.

The support element 11 defines a cross bar extending between and connected to the beams 3, 4. The support element 11 extends in a direction perpendicular to the longitudinal direction of the beams 3, 4, thereby being attached to the beams at points opposite to each other on the beams 3, 4. The support element 11 is of tubular shape. On the support element 11 there is provided a joint element 12 to which the jack 10 is connected. The jack 10 is displaceable between two positions, a first of which is shown in FIGS. 2 and 3 and a second of which is shown in FIG. 6. The two positions are on opposite sides of the support element 11. The joint element 12 is displaceable between two positions, one for each of the two above-mentioned positions of the jack 10. The displacement between its two positions is permitted since the joint element 12 is rotatable on the support element 11 around the longitudinal axis of the support element 11. The two positions are obtained by a 180° rotation of the joint element 12.

In FIGS. 2, 3 and 6 the jack is positioned in a first position, in which it is located between the support element 11 and the carrier 6 to which it is connected and on which it is acting. The jack 10 is operable in two opposite directions, i.e. it may either pull the first roll 1 towards the second roll 2, or it may push the first roll 1 away from the second roll 2.

Figure 7:
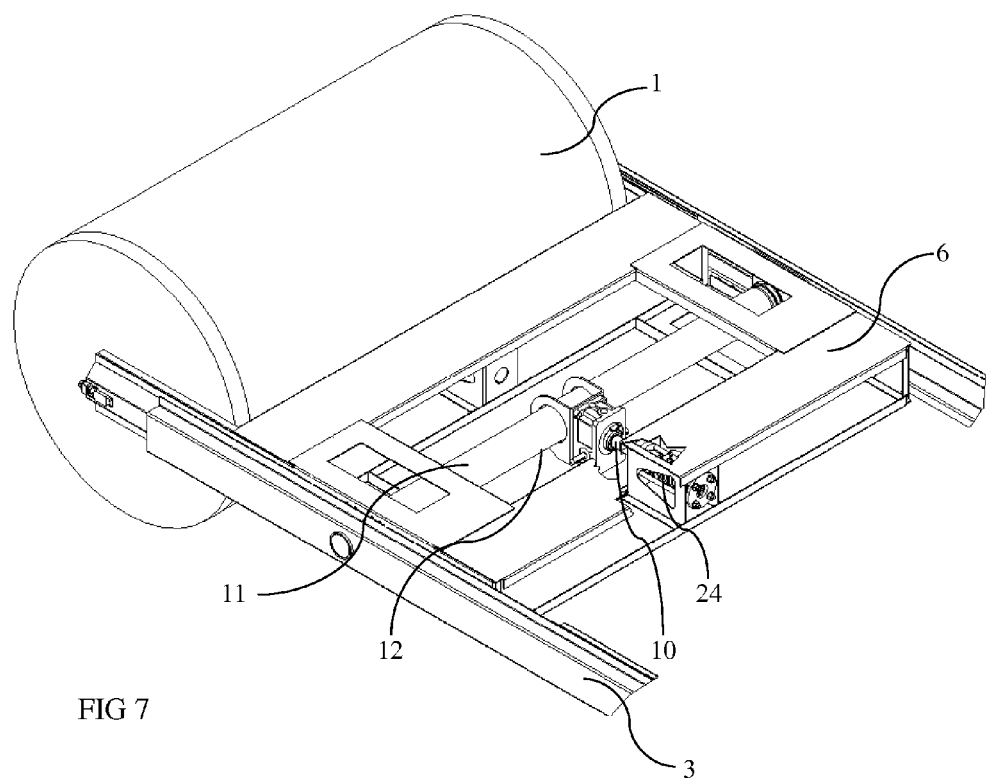
FIG. 7 is a partially cut perspective view corresponding to that in FIG. 6, showing a second embodiment of the conveyor, with the jack thereof in a second position with regard to a support element.

In FIG. 7 an alternative embodiment is provided in which the jack 10 is in its second position and in which an alternative design of the carrier 6 is also presented. In order to obtain the second position, the jack 10, the spring element 24 and the joint element 12 have been swung 180° to the opposite side of the support element 11. The carrier 6 extends beyond the support element 11 as seen in a direction from the displaceable roll 1 and presents a support surface against which the jack 11 can act on said opposite side. Likewise to the previous embodiment, the jack 10 is connected to the carrier 6 through the spring element 24, which is directly attached to the carrier 6. The carrier 6 has a cage-like design with an elongated opening that permits it to be displaced in relation to the support element 11 without being interfered by the latter within the operation range of the jack 10. Also the surfaces of the carrier 6 that bear against and are supported by the beams 3, 4 extend on said opposite side of the support element 11, thereby bringing further stability against misalignment to the carrier 6. The embodiment shown in FIG. 7 has the advantage of being fully prepared for positioning of the jack 10 in its first and second positions (while the embodiment shown in FIG. 6 needs to be supplemented with a force-transmitting element such as a rod or the like to act as a connection between the free end of the jack 10 and the carrier 6 when the jack 10 is swung to its second position.) and of being very stable against misalignment.

When the jack 10 is in its second position, it does not form an obstacle for further displacement of the first roll 1 towards the second roll 2. Accordingly, a roll of considerably larger diameter can be used when the jack 10 has been swung to its second position, or a considerably shorter conveyor length can be achieved if the roll 1 is permitted to be displaced to the region occupied by the jack 11 in its first position. Accordingly, an elevated versatility is conferred to the conveyor thanks to the above-mentioned provisions.

The joint element 12 is also displaceable along the support element 11 in a direction cross wise to the longitudinal direction of the beams 3, 4. When a single jack 10 is used, as shown in FIG. 2 for example, the joint element 12 and the jack 10 are, preferably, arranged centrally with regard to the beams 3, 4. If, however, a higher tensioning force is required than is achievable with the single jack, at least one further jack may be provided in parallel with the first jack, whereby, the jacks are preferably arranged in symmetry with regard to the centre line between the beams 3, 4. Thus, the addition of at least one further jack will require displacement of the first jack and the joint element associated thereto in the longitudinal direction of the support element, and, hence, it will be advantageous if the joint element is displaceable in said direction.

Figure 5:
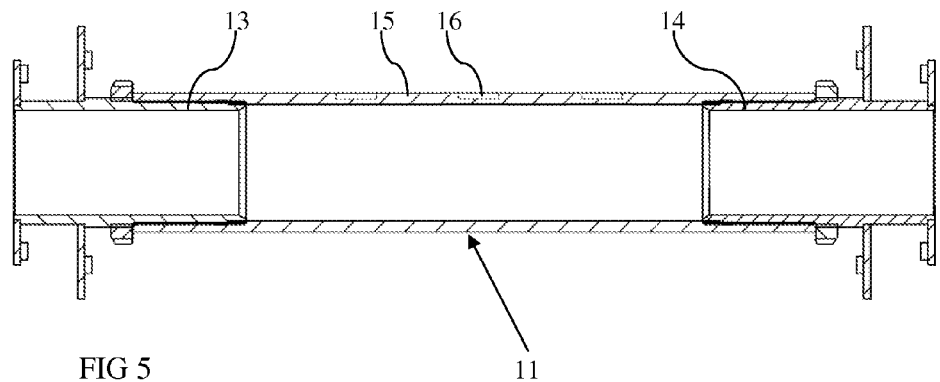
FIG. 5 is a partial cross-section from the side of a detail of the conveyor according to the invention.

With reference to FIG. 5 the support element 11 will now be further described. The support element 11 is arranged so as to permit an adjustment of the distance between the beams 3, 4 by means thereof. Thereby, the distance between the beams 3, 4 and the stability of their position in the region of the carrier 6 can be controlled by such adjustment, which is advantageous for preventing misalignment of the carrier 6. A dimension of the support element 11 is adjustable in a direction crosswise to the longitudinal direction of the beams 3, 4 so as to enable the adjustment of the distance between the beams 3, 4. The dimension of the support element 11 in said direction crosswise to the longitudinal direction of the beams is adjustable in a stepless manner, thereby enabling also very fine adjustment of said distance.

The support element 11 comprises at least two parts that are connected to each other through a screw joint, wherein the adjustment of the dimension of the support element in said direction crosswise to the longitudinal direction of the beams is a result of said parts being screwed in relation to the other part. A screw joint will have the advantages of requiring little space, being uncomplicated, reliable and also enabling stepless and fine adjustment. In the preferred embodiment shown in FIG. 5, the support element comprises at least three parts 13, 14, 15, two of which 13, 14 are connected to a respective of said beams 3, 4 and a third of which 15 is connected to each of the other parts through a respective screw joint, wherein the dimension of the support element 11 in the direction crosswise to the longitudinal direction of the beams is adjustable by means of screwing of said third part 15 in relation to said other parts 13, 14. Thereby, the parts directly connected to the beams can be, and as the matter of fact are, fixed in relation to the beams 3, 4. This is advantageous from inter alia a stability point of view. Accordingly, the support element 11 functions in accordance with the principle of a turnbuckle. On the outer periphery of the third part 15 of the support element 11 there is provided an engagement means, here exemplified by a plurality of recesses 16, to be gripped by a tool, typically a wrench, when adjustment is to be made by screwing of said part 15.

The support element 11 is tubular, thereby promoting the rotational arrangement of the joint element 12. The cross section, i.e. both shape and dimension, of the support element 11 is the same along the longitudinal direction, thereby enabling displacement of the joint element 12 in the longitudinal direction of the support element. The shape and dimension of the inner periphery of the joint element 12 corresponds to the shape and dimension of the outer periphery of the support element 11. Thereby a maintained stable connection between support element 11 and joint element 12 is provided for also when the position of the joint element 12 is altered along the support element 11.

The conveyor also comprises a pair of cross-rods 17, 18 that engages the beams 3, 4, thereby stabilising the conveyor significantly against misalignment of the beams 3, 4 due to shear forces acting on the latter. Considerable shear forces are a direct consequence of the use of a metal belt and the typical conditions related thereto, in particular the high tensioning forces applied. The metal belt 5 will not automatically find a stable central position on the rolls 1, 2 but may instead be somewhat displaced from a central position on the rolls 1, 2 due to inherent properties of the belt 5 and hence generate a shear force on the frame, i.e. the beams 3, 4. The rolls 1, 2 used for the metal belt 5 do not present any crowning, but have a continuous diameter along a major part of their length (or the same diameter for the sheaves if a plurality of sheaves are used), since a crowning would not contribute to any displacement of the belt 5 towards the centre of the roll 1, 2.

The cross-rods 17, 18 cross each other and define an X-shaped component which is connected to the beams 3, 4 in its four ends. The cross-rods 17, 18 are connected to each other in the region in which they intersect each other, in order to provide for the requested shear strength of the frame. The component formed by the cross-rods 17, 18 is located on the opposite side of the support element 11 with regard to the displaceable roll 1. Preferably, they are arranged approximately on the middle of the length of the conveyor, which is normally on the middle of the length of the beams 3, 4.

The conveyor also comprises a belt-lifting element 19 arranged to lift an upper strand of the belt 5, for example for the purpose of giving access to the interior of the conveyor in connection to maintenance work, cleaning or the like. The belt-lifting element is supported by the beams 3, 4 and is located on the opposite side of the support element 11 with regard to the displaceable roll 1, preferably approximately at a mid-section of the conveyor. The jack 10 is connected to the belt-lifting element 19 and induces the belt-lifting operation of the belt-lifting element 19 when operated to a predetermined degree in a belt tension-releasing direction. The belt-lifting element 19 comprises a crampon and the part of the jack 10 which acts on the displaceable roll 1 is connected to the belt-lifting element 19 through a rod 20 extending in the longitudinal direction of the conveyor. The crampon 19 is provided with an upper plate 21 through which it acts from below on the upper strand of the belt 5. When the jack 10 is in its second position, said part of the jack 10 acts directly on the belt lifting element 19 or through a shorter intermediate transmission element (not shown).

Furthermore, the conveyor comprises a belt-supporting element 22 arranged so as to support the belt 5 by bearing against the lower surface of an upper strand of the belt 5. The belt-support element 22 comprises a plurality of sheets that are planar and provided so as to protect the belt from buckling due to the impact of objects falling down onto the upper part of the belt 5 during operation of the conveyor. Instead of sheets, rolls or the like might like serve as belt-supporting elements, however with the disadvantage of conferring only linear support to the belt 5. The belt-supporting element 22 may be supported by the beams 3, 4, but here it is at least partly suspended on the belt lifting-element 19. It is hinged such that it will be tilted relative to the lifting plate 21 when the latter is lifted. Thereby, the belt 5 will go free from the belt supporting element 22 during lifting of the belt 5 by means of the belt lifting element 19 and lifting plate 22. When the lifting-element 19 is in an inactive position, i.e. in the operative position of the conveyor, the upper surface of the lifting plate 21 is in alignment with the upper surface of the belt-supporting element 22, thereby contributing to the support of the belt 5.

More than one support element 11 for the adjustment of the distance between the beams 3, 4 may be provided in the conveyor. Moreover, both ends of the conveyor may be provided with support elements like the support element 11 described above, regardless of whether or not both rolls 1, 2 are displaceable in the longitudinal direction of the beams 3, 4. Also the second roll 2 may be displaceable in the longitudinal direction of the beams 3, 4, and there may be provided a second jack connected to and acting on the second roll 2 in the same or similar way as has been described for the first roll 1. In fact, in the embodiment presented above, the second roll 2 is carried by a second carrier 25, and there is provided a second support element 26 corresponding to the first support element 11 and at a corresponding position with regard to the second roll 2 and its carrier 25. Accordingly, the second end of the conveyor, carrying the second roll 2, is prepared for the same functionality as the first end as regards control of distance between beams 3, 4 and displacement of the second roll 2.

Figure 8:
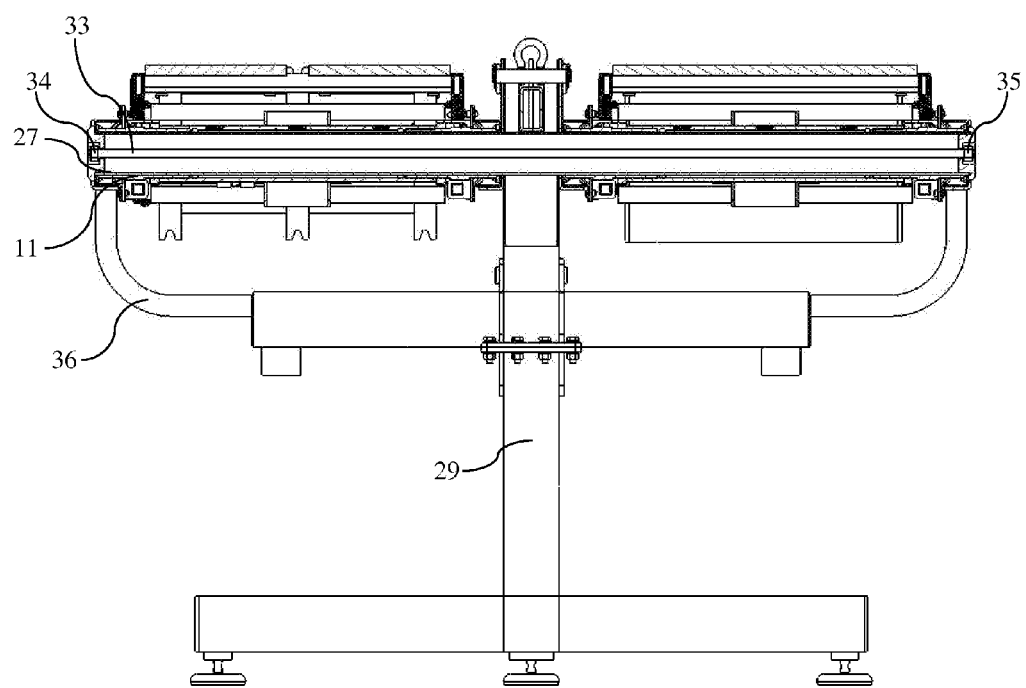
FIG. 8 is a cross-sectional end view of a further embodiment of the conveyor according to the invention, showing two parallel conveyors suspended on a common suspension arrangement.

FIG. 8, presenting two parallel conveyors suspended on a common suspension arrangement, shows a further embodiment of the conveyor, according to which the support element 11 is tubular, and the frame comprises at least one suspension arm 27 which extends through the beams 3, 4 and on which the beams 3, 4 are suspended, wherein the suspension arm 27 extends inside the support element 11. Thereby, the support element has a triple function, since it serves to alter the distance between the beams 3, 4, and as a support for the jack 10, and for supporting and housing the suspension arm 27. In the preferred embodiment, there is provided a first suspension arm 27 extending through the first support element 11 and a second, corresponding suspension arm (hidden in FIG. 8 though) extending through the second support element 26, thereby conferring greater stability to the conveyor. The suspension arm or arms 27 is/are connected to and extends generally horizontally from a wall or, as in the presented embodiment, a vertical post 29. There are provided openings 31, 32 in the beams 3, 4 (see also FIGS. 1-3) through which the respective suspension arm 27 extends. The outer diameter of the suspension arm 27 corresponds to the inner diameter of the tubular support element 11 that it extends through. Accordingly, the suspension arm 27 is coaxial with the support element 11 and is firmly held inside the latter. The suspension arms, when more than one such arm 27 is provided, are parallel and extend perpendicularly to the longitudinal direction of the beams 3, 4. As a result of such a design, assembly of the conveyor is facilitated since the beams 3, 4 may simply be lifted and slid onto the suspension arms 27.

Inside the suspension arm 27 and in parallel therewith, there is provided a tensioning rod 33 from one end to the other of the suspension arm 27. The tensioning rod 33 engages the suspension arm 27 in a first end and there is provided a tensioning means, hear exemplified by a nut 34 for generating a compressive force on the suspension arm through the rod 33. The rod 33 is therefore provided with a threading in its end region where it engages the nut 34. The opposite end of the rod 33 is in a fixed position, or at least in a position in which it is able to be fixed. Here, also the opposite end of the rod 33 engages the suspension arm 27, such that a tightening of the nut 34 will result in the application of said compressive force. Here, also the opposite end of the rod 33 is provided with a nut 35 by means of which it is in firm engagement with the suspension arm 27. The advantage of this feature is that it will enable a stabilising of the suspension arm 27 if considered necessary, for example if any one of the beams 3, 4 tend to bend down due to the weight carried by it, and if for example, during assembly of the conveyor, any further support means, such as a further support 36 shown in FIG. 8, for the beam is temporarily removed.

It should be noted that the provision of the suspension arm 27 is not restricted to the double conveyor design shown in FIG. 8, but that it is valid also for single conveyor designs or arrangements with more than two parallel conveyors.

Figure 9:
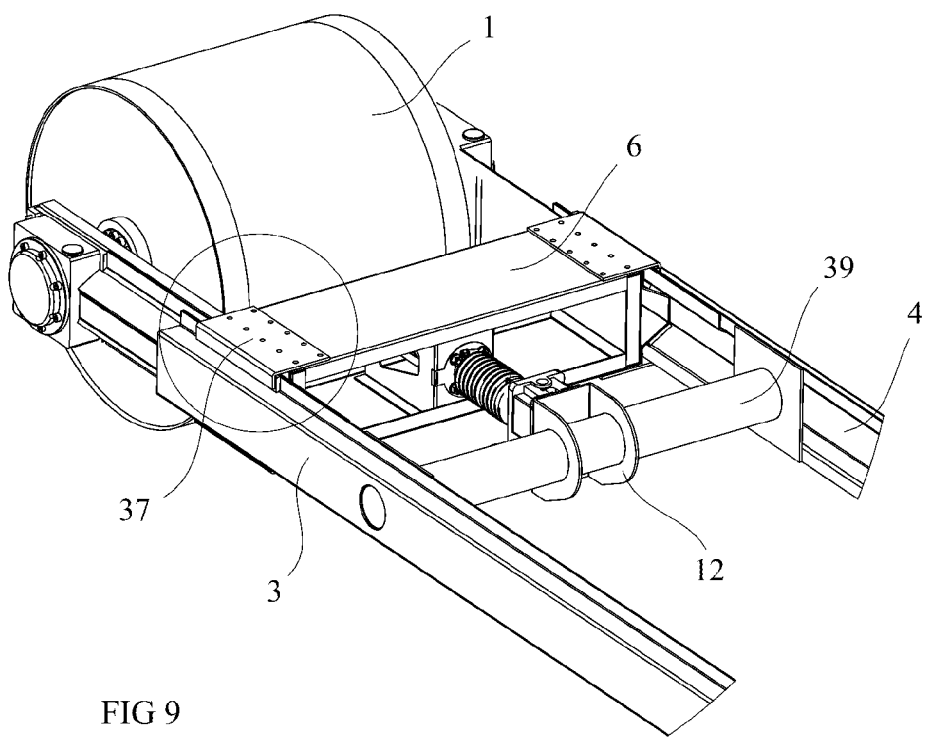
FIG. 9 is a perspective view of an alternative embodiment of a part of the conveyor according to the invention.
Figure 10:
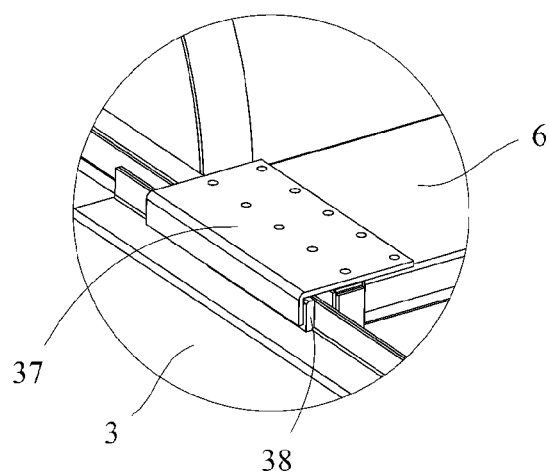
FIG. 10 is detailed view of a part of the conveyor shown in FIG. 9.

FIGS. 9 and 10 show an alternative embodiment of the conveyor according to the invention. Here, the support element 11, with its turnbuckle design, has been replaced by a rigid tubular support element 39. The support element 39 does not enable adjustment of the distance between beams 3, 4 like the support element 11 of the first embodiment. Instead, in order to provide for a stabilisation of the position of and distance between the beams 3, 4, this embodiment comprises the provision of guiding elements 37, attached to or arranged as a part of the carrier 6 and arranged so as to engage an outer lateral surface of the respective beam 3, 4, thereby preventing the beams 3, 4 from departing from each other. There is provided one guiding element 37 at each opposite lateral end of the carrier 6. The guiding element 37 has the shape of a bent plate one leg of which is attached to the carrier 6 and another leg of which provides for the engagement of the respective beam 3, 4. In the embodiment shown in FIGS. 9 and 10, there is provided a further sliding element 38, which is attached to a lateral inner surface of the leg that provides for engagement with the beam 3, 4. The sliding element 38 is made of a material having a lower friction coefficient than the material of the guiding element 37 itself, and provides for improved sliding ability of the guiding element 37 along the outer periphery of the respective beam 3, 4. The provision of the guiding elements 37 may be regarded as an alternative to the use of the adjustable support element 11 used in the previously described embodiments. However, it may also be used as a supplement to the use of an adjustable support element. Accordingly, any of the embodiments disclosed herein may include guiding elements like the guiding elements 37 disclosed in FIGS. 9 and 10. In such cases, the support element need not be adjustable like the support element 11 but may as well be non-adjustable like the support element 39 shown in FIGS. 9 and 10.

It should be understood that the above description of the conveyor according to the invention has been made by way of example, and that further embodiments obvious to the person skilled in the art are covered by the scope of protection as defined in the annexed claims supported by the description and the drawing. For clarity reasons some details, such as bolts etc for the fastening of individual components of the conveyor to each other have been left out from the drawing and the description, since they are regarded as obvious to the person skilled in the art and do not contribute to the inventiveness of the conveyor.

The invention claimed is:

1. A conveyor, comprising:
two opposite rolls;
a frame that comprises two opposite beams that carry the rolls and extend in their longitudinal direction between the rolls;
an endless metal belt extending in a path around and carried by the two rolls; and
a support element that extends between and is connected to each of the two beams,
wherein at least one of the rolls is displaceable in the longitudinal direction of the beams in order to enable tightening or loosing of the belt,
wherein there is provided a jack that is connected to and acts on said roll for said displacement thereof,
wherein the jack is displaceable between at least two operative positions in the longitudinal direction of the beams,
wherein the jack is connected to and supported by the support element, and
wherein said two positions are on opposite sides of the support element.

2. A conveyor according to claim 1 wherein the support element is arranged so as to permit an adjustment of the distance between the beams by means thereof, and that a dimension of the support element is adjustable in a direction crosswise to the longitudinal direction of the beams so as to enable the adjustment of the distance between the beams.

3. A conveyor according to claim 2, wherein the dimension of the support element in said direction crosswise to the longitudinal direction of the beams is adjustable in a stepless manner.

4. A conveyor according to claim 2, wherein the support element comprises at least two parts that are connected to each other through a screw joint, and that the adjustment of the dimension of the support element in said direction crosswise to the longitudinal direction of the beams is a result of one of said parts being screwed in relation to the other part.

5. A conveyor according to claim 2, wherein the support element comprises at least three parts, two of which are connected to a respective of said beams and a third of which is connected to each of the other parts through a respective screw joint, and wherein the dimension of the support element in said direction crosswise to the longitudinal direction of the beams is adjustable by means of screwing of said third part in relation to said other parts.

6. A conveyor according to claim 1, wherein at least one of the rolls is displaceable in the longitudinal direction of the beams in order to enable tightening or loosing of the belt, and that the support element is located closer to said displaceable roll than to the opposite other roll.

7. A conveyor according to claim 1, wherein the rolls have parallel centre lines, and that each beam presents a centre line in its longitudinal direction, and that the centre lines of the rolls and the beams extend in a common plane.

8. A conveyor according to claim 1, wherein the conveyor comprises a pair of cross-rods that engages the beams.

9. A conveyor according to claim 1, wherein the conveyor comprises a belt-supporting element arranged so as to support the belt by bearing against the lower surface of an upper strand of the belt.

10. A conveyor according to claim 1, wherein said support element is tubular, that the frame comprises at least one suspension arm which extends through the beams and on which the beams are suspended, and that the suspension arm extends inside the support element.

11. A conveyor, comprising:
two opposite rolls;
a frame that comprises two opposite beams that carry the rolls and extend in their longitudinal direction between the rolls;
an endless metal belt extending in a path around and carried by the two rolls; and
a support element that extends between and is connected to each of the two beams,
wherein at least one of the rolls is displaceable in the longitudinal direction of the beams in order to enable tightening or loosing of the belt,
wherein there is provided a jack that is connected to and acts on said roll for said displacement thereof,
wherein the jack is displaceable between at least two operative positions in the longitudinal direction of the beams, and
wherein said jack is connected to a belt-lifting element arranged to lift an upper strand of the belt, wherein the jack induces the belt-lifting operation of the lifting element when operated to a predetermined degree in a belt tension-releasing direction.

12. A conveyor, comprising:
two opposite rolls;
a frame that comprises two opposite beams that carry the rolls and extend in their longitudinal direction between the rolls;
an endless metal belt extending in a path around and carried by the two rolls; and
a support element that extends between and is connected to each of the two beams,
wherein at least one of the rolls is displaceable in the longitudinal direction of the beams in order to enable tightening or loosing of the belt,
wherein there is provided a jack that is connected to and acts on said roll for said displacement thereof,
wherein the jack is displaceable between at least two operative positions in the longitudinal direction of the beams, and
wherein the support element is provided with a joint element to which the jack is connected, and that the joint element is displaceable between two positions, one for each of the two positions of the jack.

13. A conveyor according to claim 12, wherein the support element presents a longitudinal axis crosswise to the longitudinal direction of the beams and that said joint element is rotatable on the support element around the longitudinal axis of the support element between two opposite positions.

14. A conveyor according to claim 12, wherein the support element is provided with a joint element to which the jack is connected, and that the joint element is displaceable along the support element in a direction cross wise to the longitudinal direction of the beams.

15. A conveyor according to claim 13 wherein the support element is provided with a joint element to which the jack is connected, and that the joint element is displaceable along the support element in a direction cross wise to the longitudinal direction of the beams.

* * * * *

UNITED STATES PATENT AND TRADEMARK OFFICE
CERTIFICATE OF CORRECTION

| | | |
|---|---|---|
| PATENT NO. | : 8,967,373 B2 | Page 1 of 1 |
| APPLICATION NO. | : 13/582074 | |
| DATED | : March 3, 2015 | |
| INVENTOR(S) | :Nils Hakan Eriksson | |

It is certified that error appears in the above-identified patent and that said Letters Patent is hereby corrected as shown below:

Title Page Item 75 Inventor should read: Nils Hakan Eriksson

Signed and Sealed this
Eighth Day of March, 2016

Michelle K. Lee
*Director of the United States Patent and Trademark Office*